United States Patent
Lee et al.

(10) Patent No.: US 12,245,691 B2
(45) Date of Patent: Mar. 11, 2025

(54) CONNECTOR, CONNECTOR ASSEMBLY FOR SOFA ASSEMBLY, AND SOFA ASSEMBLY

(71) Applicant: Zinus Inc., Gyeonggi-do (KR)

(72) Inventors: Younjae Lee, Gyeonggi-do (KR); Munhan Bae, Gyeonggi-do (KR); Keunyoung Kim, Gyeonggi-do (KR)

(73) Assignee: Zinus Inc., Gyeonggi-do (KR)

( * ) Notice: Subject to any disclaimer, the term of this patent is extended or adjusted under 35 U.S.C. 154(b) by 50 days.

(21) Appl. No.: 18/169,796

(22) Filed: Feb. 15, 2023

(65) Prior Publication Data

US 2023/0255350 A1    Aug. 17, 2023

Related U.S. Application Data

(63) Continuation-in-part of application No. PCT/CN2021/107501, filed on Jul. 21, 2021.

(30) Foreign Application Priority Data

Aug. 24, 2020   (CN) .................. 202021781561.7

(51) Int. Cl.
| | |
|---|---|
| A47C 1/12 | (2006.01) |
| A47B 87/00 | (2006.01) |
| A47C 1/124 | (2006.01) |
| A47C 13/00 | (2006.01) |
| A47C 17/02 | (2006.01) |

(52) U.S. Cl.
CPC ........... *A47B 87/007* (2013.01); *A47C 1/124* (2013.01); *A47C 13/005* (2013.01); *A47C 17/02* (2013.01)

(58) Field of Classification Search
CPC .............................. A47C 1/124; A47C 13/005
See application file for complete search history.

(56) References Cited

U.S. PATENT DOCUMENTS

3,669,491 A  *  6/1972  Weslock ............... A47C 1/124
                                                         24/339

FOREIGN PATENT DOCUMENTS

| CN | 202048063 U | 11/2011 |
|---|---|---|
| CN | 203114818 U | 8/2013 |
| CN | 203570769 U | 4/2014 |
| CN | 208918979 U | 5/2019 |
| CN | 210204083 U | 3/2020 |
| CN | 213429281 U | 6/2021 |

(Continued)

OTHER PUBLICATIONS

PCT/CN2021/107501 International Search Report and Written Opinion dated Sep. 24, 2021 (w/ English translation).

*Primary Examiner* — Timothy J Brindley
(74) *Attorney, Agent, or Firm* — Wilson Sonsini Goodrich & Rosati

(57) ABSTRACT

The present disclosure provides a connector assembly, the connector assembly comprises: at least two legs, wherein each of the at least legs is configured to be fixed to a sofa component, respectively; a connector, wherein the connector comprises: at least one middle board; one or more arms extending from the middle board, wherein each arm is configured to form a slot for receiving a corresponding leg of the at least two legs of the sofa component; wherein at least one of the one or more arms comprises a flanging tip, and wherein each of the at least two legs has a cross-section shape that is correspond to an inner shape of the slot.

16 Claims, 17 Drawing Sheets

(56) References Cited

FOREIGN PATENT DOCUMENTS

| | | | | |
|---|---|---|---|---|
| CN | 217039453 U | | 7/2022 | |
| DE | 202019102205 U1 | * | 8/2020 | |
| JP | S56128058 U | | 10/1981 | |
| JP | S56158954 U | | 12/1981 | |
| JP | 09173176 A | * | 7/1997 | ............ A47C 1/124 |
| KR | 102218617 B1 | * | 2/2021 | |
| WO | WO-2019239281 A1 | | 12/2019 | |
| WO | WO-2022042142 A1 | | 3/2022 | |

* cited by examiner

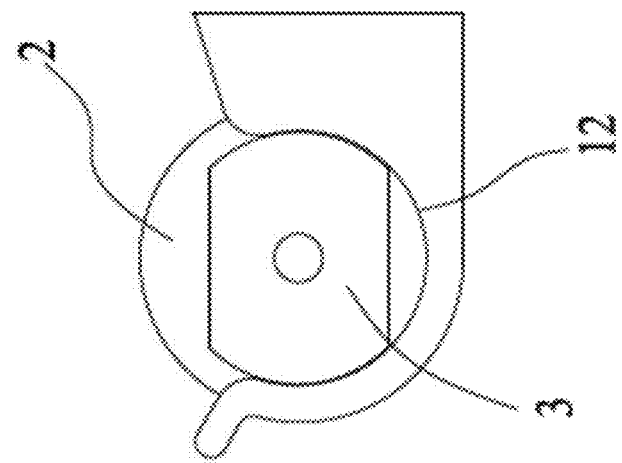
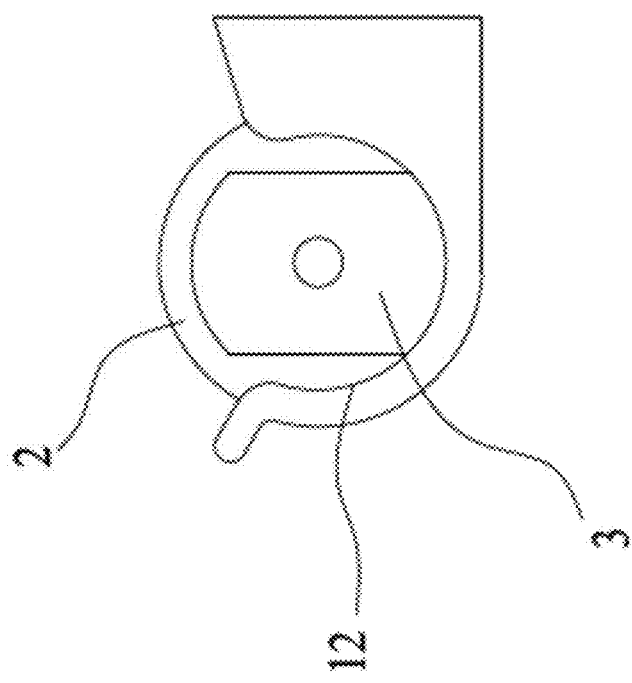
FIG. 6A
FIG. 6B

CONNECTOR, CONNECTOR ASSEMBLY FOR SOFA ASSEMBLY, AND SOFA ASSEMBLY

CROSS-REFERENCE

This application is a continuation-in-part application of International Application No. PCT/CN2021/107501, filed Jul. 21, 2021, which claims the benefit of and priority to Chinese Patent Application No. 202021781561.7 filed on Aug. 24, 2020, each of which is incorporated herein by reference in its entirety for all purposes.

BACKGROUND

Nowadays, sofa assembly (e.g., a multiple person sofa) often consist of components (such as armrests, frames, and backrests, or different sections of a sofa assembly, etc.) that are assemblable and disassemblable for easy packaging, storage (e.g., in a warehouse, in a user's storage area), and shipping (e.g., when shipping to a user). After being manufactured and/or disassembled for packaging, storage, and shipping, it may require to be assembled in an easy, fault-proof manner by an end user.

SUMMARY

The present disclosure provides a sofa assembly that can be easily assembled. In another aspect, the present disclosure provides a connector that may provide easy connections between sofa components. In another aspect, the present disclosure provides a connector assembly that may comprise corresponding connectors that provide easy connection between sofa components.

Currently, the conventional way to connect sofa components, such as different sections of a sofa assembly, or to connect two frames together, is through a slot structure. This involves one slot insertion element being inserted into another slot receiving element. The slot receiving element is typically made up of a connecting plate, and two side plates located on either side of the connecting plate. The distance between the side plates decreases from one side to the other (e.g., from top to bottom), and the ends of the side plates are bent inward to create limit parts. The connecting plate, side plates (e.g., including the limit parts) create an insertion space for receiving the corresponding insertion element. However, one disadvantage of this slot structure is that it requires manual effort that includes lifting up one sofa component, aligning the insertion element with the insertion space on another sofa component, and inserting the insertion element into the insertion space. This manual process is physically demanding and requires a significant amount of effort. Additionally, it is not convenient for household usage due to the manual labor involved.

Another disadvantage of this slot structure is that it demands high accuracy in the manufacturing process. If there is an error in the production of one or both of the two slot structures/elements, it can lead to difficulties in aligning them during assembly. This is because if the slot structures/elements are not manufactured to the precise dimensions required, they may not fit together properly, making it difficult to align them. This can result in misalignment, difficulty in fitting the pieces together and even the risk of damaging the structures/elements during assembly. This is one of the drawbacks of using a slot structure for connection which demands high precision in the manufacturing process and even small errors can cause difficulties during assembly. After assembly, the error in the production of the slot structures/elements may cause the sofa to be unstable, have loose connections, or even be unsafe for use. The misalignment caused by the manufacturing error may lead to the sofa being wobbly or having a weak structure. Additionally, the loose connections could cause the sofa to come apart during use, posing a risk of injury to the user. In some cases, the misalignment may also cause the sofa to look uneven or asymmetrical.

Recognized herein are various limitations with connectors and/or connector assembly. The present disclosure aims to address the shortcomings and technical disadvantages of commercially available sofa assemblies and the connectors and/or connector assembly by providing connectors and/or connector assembly that are easy to use and minimize the risk of errors during assembly. This present disclosure provides a sofa connector and assembly that may eliminate the need to lift up one of the sofa components in order to connect them, which may eliminate the lifting and maneuvering heavy parts, making the process easier and less physically demanding. The presented disclosure improves the overall functionality and quality of the sofa assembly while addressing the structural challenges.

Additionally, the conventional design of connectors may only provide connections between two sofa components. One aspect of the present disclosure provides a sofa connector and assembly that can facilitate connections between more than two sofa components, providing several benefits. For example, by being able to connect more than two sofa components, the present disclosure provides flexible design options for the sofa assembly. Additionally or alternatively, the ability to connect multiple components can also make the sofa more versatile, allowing it to adapt to a wider range of spaces and configurations. In another aspect, by connecting multiple sofa components together, the stability of the overall assembly is improved, reducing the risk of tipping or instability.

In one aspect, the present disclosure provides a connector, comprising: at least one middle board; one or more arms extending from the middle board, wherein each arm is configured to form a slot for receiving a leg of a sofa component; wherein at least one of the one or more arms comprises a flanging tip. In some embodiments, the one or more arms comprise a curved portion, wherein the curved portion is substantially round with an opening. In some embodiments, the opening may be configured to allow the leg of the sofa component to pass through when assembling the connector with one or more sofa components, and thereby facilitate the leg to be fit inside the slot. In some embodiments, the connector comprises two arms. In some embodiments, the connector comprises three arms. In some embodiments, the connector further comprises a rim located on an outer edge of the arm and the middle board, wherein the rim has a width that is greater than the width of the arm and the middle board. In some embodiments, the rim comprises a wider portion, wherein the wider portion has a width that is greater than the width of the rest of the rim.

In an aspect, the present disclosure provides a connector assembly, comprising at least two legs, wherein each of the at least legs is configured to be fixed to a sofa component, respectively; a connector, wherein the connector comprises: at least one middle board; one or more arms extending from the middle board, wherein each arm is configured to form a slot for receiving a corresponding leg of the at least two legs of the sofa component; wherein at least one of the one or more arms comprises a flanging tip, and wherein each of the at least two legs has a cross-section shape that is correspond to an inner shape of the slot. In some embodiments, each of the legs comprises a support block located on top portion of the leg. In some embodiments, the support block has a smaller cross-section area than a cross-section area of a mainbody of the at least two legs. In some embodiments, the support block comprises: a lid, a neck, wherein the neck comprises a top portion and a bottom portion. In some embodiments, the top portion of the neck has a smaller cross-section area than the bottom portion. In some embodiments, the connector further comprises a rim located on an outer edge of the arm and the middle board, wherein the rim has a width that is greater than the width of the arm of the middle board. In some embodiments, the rim comprises a wider portion, wherein the wider portion has a width that is greater than the width of the rest of the rim. In some embodiments, the connector comprises two or more arms.

In an aspect, the present disclosure provides a sofa, comprising: one or more sofa components, wherein the sofa components are configured to be connected by one or more connector assembly, wherein the connector assembly comprises: at least two legs, wherein each of the at least legs is configured to be fixed to one of the sofa components; a connector, wherein the connector comprises: at least one middle board; one or more arms extending from the middle board, wherein each arm is configured to form a slot for receiving a corresponding leg of the at least two legs of the sofa component; wherein at least one of the one or more arms comprises a flanging tip, and wherein each of the at least two legs has a cross-section shape that is correspond to an inner shape of the slot. In some embodiments, each of the legs comprises a support block located on top portion of the leg. In some embodiments, the support block has a smaller cross-section area than a cross-section area of a mainbody of the at least two legs. In some embodiments, the support block comprises a lid and a neck, wherein the neck comprises a top portion and a bottom portion. In some embodiments, the connector further comprises a rim located on an outer edge of the arm and the middle board, wherein the rim has a width that is greater than the width of the arm of the middle board. In some embodiments, the rim comprises a wider portion, wherein the wider portion has a width that is greater than the width of the rest of the rim.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 6A and 6B schematically illustrate top views of a connector assembly of the present disclosure.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure addresses the shortcomings and technical disadvantages of traditional sofa connectors and/or connector assembly, which may compromise easement during production of the connectors, easement during the alignment and/or assembly process, and stability, strength of the connections and the sofa.

Disclosed herein are various examples of sofa connectors and/or connector assembly that are improved on easement during production of the connectors, easement during the alignment and/or assembly process, and stability, strength of the connections and the sofa.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1:
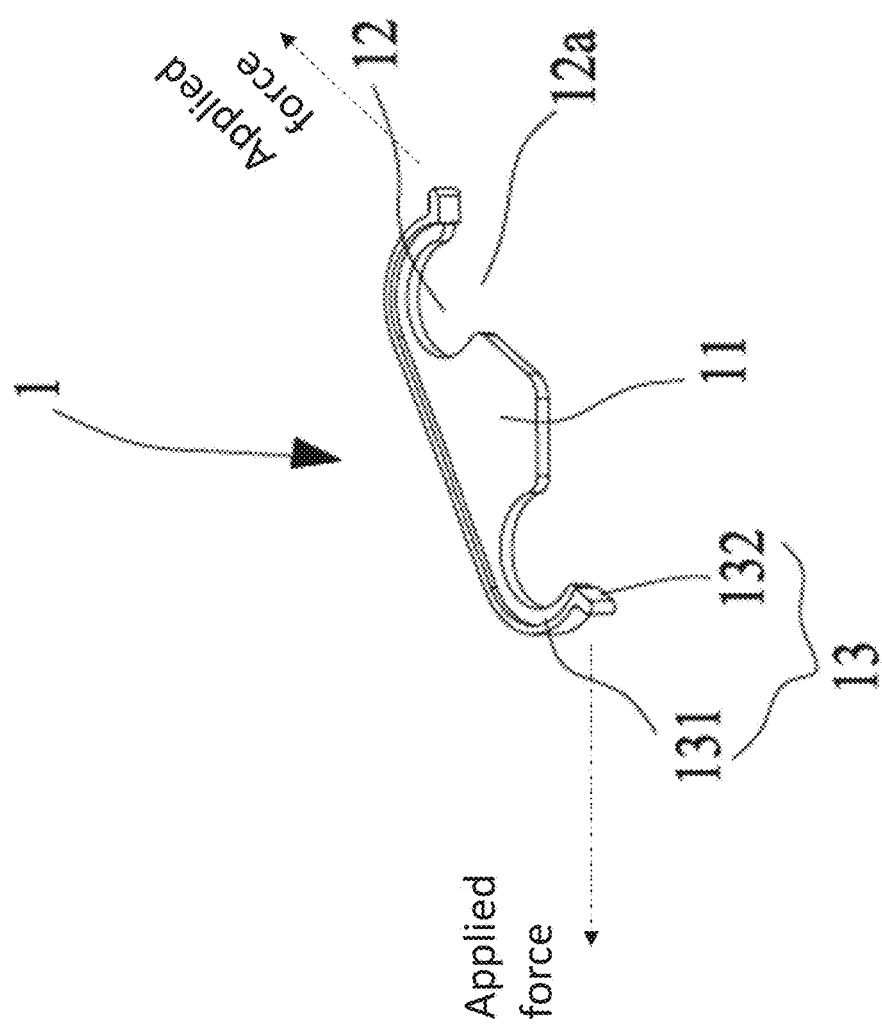
FIG. 1 schematically illustrates a perspective view of a connector of the present disclosure.

FIG. 1 schematically illustrates a perspective view of a connector 1 of the present disclosure. As shown in FIG. 1, the connector 1 may comprise a middle board 11, one or more arms 13, and one or more slots 12. The sofa connector 1 in some embodiments of the present disclosure provides a way to connect two adjacent support legs 2 of two or more sofas and/or two or more sofa components to form a double or multi-person sofa. The connector 1 may comprise two slots 12 that are spaced apart by the middle board 11 and is designed to engage with two support legs 2 that are adjacent to each other. To use the connector 1, the two sofa components and/or frames are placed together (i.e., side by side) and the openings 12a of the two slots 12 are aligned with the two adjacent support legs 2 (not shown in FIG. 1). The slots 12 may be engaged with the support legs 2 by sliding them along the outside surface of the support legs 2. This makes it easy to assemble the sofa with only one person and saves time and effort.

In some embodiments, to ensure the reliability of the connection between the sofa connector 1 and the support legs 2, the shape of the slot 12 may be adapted to the shape of the location where the support legs 2 are fitted into the slots 12. That is, the slot 12 can be tightly fitted at the position where the support legs 2 are fitted into the slots 12. For example, anti-slip rings may be installed in the position where the support legs 2 are fitted into the slots, and/or the fitted location of the support legs 2 may be designed with steps, wherein the steps may provide sufficient traction between the connector 1 and the support legs 2 to secure them in a locked position.

As shown in FIG. 1, the arm 13 may comprise a curved portion 131, wherein the corresponding side of the middle board 11 and the curved portion 131 may form the slot 12. In some embodiments, the slot 12 may have a substantially round inner shape, with an opening 12a to receive one or more supporting elements (e.g., legs) of the sofa components. In some embodiments, the slot 12 is in a perfect circle shape with an opening 12a. In some embodiments, the slot 12 is arched, such as it has a partially round ring shape. The legs 2 (not shown in FIG. 1) of the sofa or sofa component may be mostly designed as cylindrical. That is, the support legs 2 can be smoothly fitted into the arched slot 12, further simplifying the assembly of the sofa.

In some embodiments, the arm 13 may comprise the curved portion 131 and a flanging tip 132, as shown in FIG. 1. In some embodiments, one end of the arm 13 may be connected to the bottom of middle board 11 and the other end is bent upward to form the flanging tip 132, with the arm 13 forms a slot 12 (additionally or alternatively, together with middle board 11). That is, in some embodiments, the slot 12 is formed by one side of middle board 11 and arm 13. The curved portion 131 may provide the slot 12 with an arched shape, allowing it to fit surrounding the support legs 2.

In some embodiments, as shown in FIG. 1, the flanging tip 132 may be configured to be bent outward from the curved portion 131 at the opening 12a of slot 12. In some embodiments, the flanging tip 132 may provide a handle when assembling and/or disassembling the connector 1 to and/or from a sofa component, and therefore facilitate easy use of the connector 1. For example, as shown in FIG. 1, when assembling and/or disassembling the connector 1 to and/or from a sofa component, one may apply force to the flanging tip 132 along the applied force direction to enlarge the opening 12a so to allow easy connection and/or disconnection.

In some examples, the top surface of middle board 11 may have two inclined surfaces, with the incline direction of the two inclined surfaces opposite to each other and both inclined upward towards the center line of middle board 11. The two inclined surfaces may be connected by an arc transition. That is, in some embodiments, the middle board 11 can be smoothly inserted between the two support legs 2 through the inclined surfaces, because the inclined surfaces may provide a guiding path function.

Figure 2A:
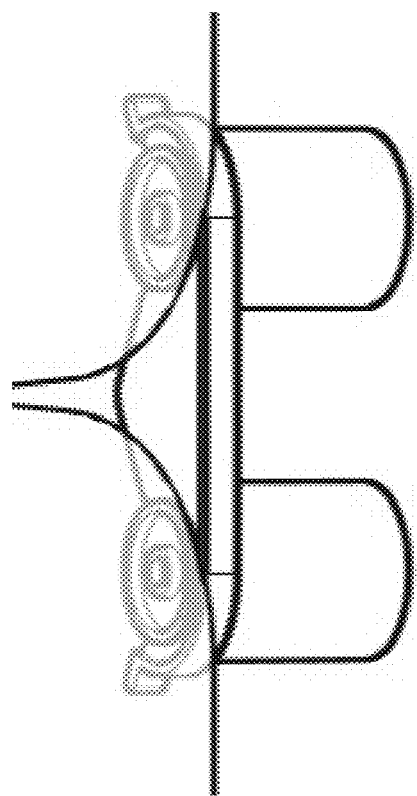
FIG. 2A schematically illustrates a perspective view of a connector assembly of the present disclosure in an intermediate stage of the assembling process.

FIG. 2A schematically illustrates a perspective view of a connector assembly of the present disclosure in an intermediate stage of the assembling process. As shown in FIG. 2A, in some embodiments, the legs 2 of one or more sofa components may have a cylinder shape with a round shape cross-section. When assembling the sofa components with the connector 1, one may align the slot 12 with two legs, and push inward. In some embodiments, the connector 1 is made of elastic material, which is a material that may undergo deformation under stress and returns to its original shape after the stress is removed. In some embodiments, the elastic material may possess sufficient stiffness and resistance to deformation that may provide a stable connection when assembled. In some embodiments, the elastic material may have an elasticity of 50-2000 MPa. In some embodiments, the elastic material may have an elasticity of 50, 100, 200, 300, 400, 500, 600, 700, 800, 900, 1000, 1500, 2000 MPa. In some embodiments, depending on the configurations of the sofa assembly (e.g., weight, size, etc.), the connector 1 may be made from higher or lower elasticity materials to provide sufficient stability. In some embodiments, the elastic material may comprise plastic, shape-memory alloys, or metals. This elasticity may facilitate easy assembly of the sofa components. For example, as discussed elsewhere herein, the elasticity may allow a temporary deformation when forces are applied to the flanging tips 132 (reference number is not shown in FIG. 2A, please refer to FIG. 1) so to enlarge the opening 12a (reference number is not shown in FIG. 2A, please refer to FIG. 1) to allow insertion of the legs 2.

Figure 2B:
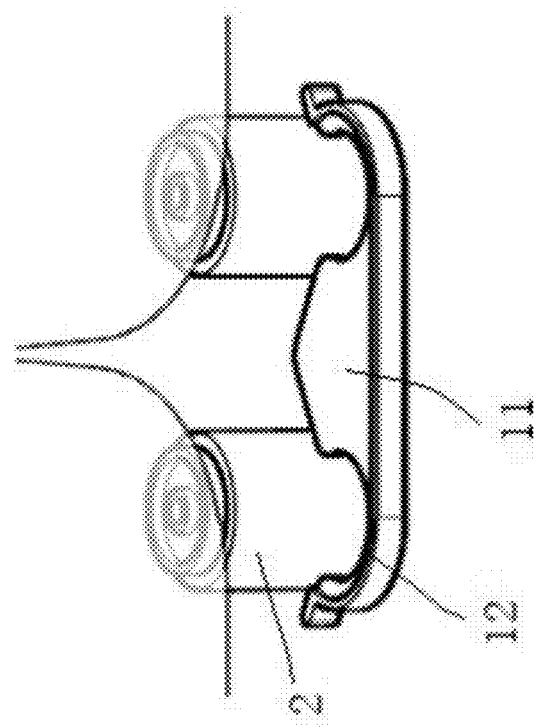
FIG. 2B schematically illustrates a perspective view of a connector assembly of the present disclosure in a final stage of the assembling process.

FIG. 2B schematically illustrates a perspective view of a connector assembly of the present disclosure in a final stage (i.e., locked state) of the assembling process. Once the connector 1 is pushed to surround the legs 2, as shown in FIG. 2A, one may push the connector 1 upward into a locking position. As shown in FIG. 2B, the top portion of the leg 2 may comprise an indented neck, wherein the indented neck may have a smaller size than the leg 2 (i.e., a smaller perimeter than the leg 2, a smaller cross-section area than the leg 2). In some embodiments, the indented neck may have a perimeter that is the same or slightly smaller than the inner perimeter of the slot 12. In some embodiments, the leg 2 may have a perimeter that is slightly greater than the inner perimeter of the slot 12 and therefore may produce an outward force when the connector 1 is configured to surround the leg 2. When the connector 1 is pushed up to the indented neck, because of the removal of the outward force, the connector 1 may return to its original shape, and thereby lock with the indented neck of the legs 2.

Figure 3:
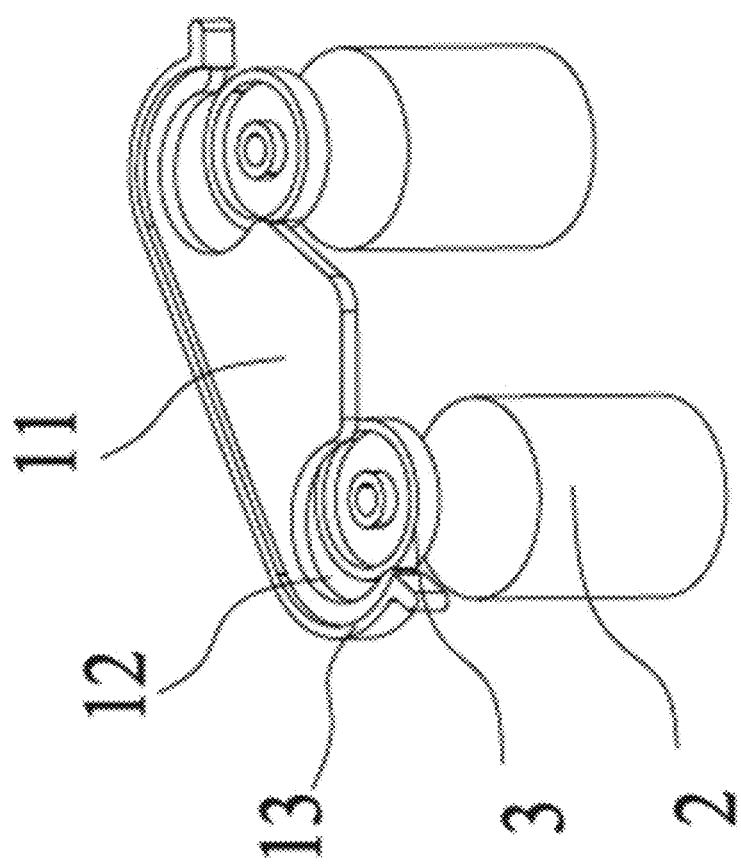
FIG. 3 schematically illustrates a perspective view of a connector assembly of the present disclosure.

FIG. 3 schematically illustrates a perspective view of a connector assembly of the present disclosure. As shown in FIG. 3, the connector assembly may comprise the connector 1, and at least 2 legs of different sofa components, respectively. In some embodiments, a support block 3 may be placed on top of the leg 2. In some embodiments, the support block 3 is part of the leg 2, i.e., the leg 2 comprises a support block 3. In the present disclosure, this support block 3 may be referred to as an indented neck. In some embodiments, the support block 3 may be part of the leg 2. As discussed, the support block 3 may have a smaller cross-sectional area compared to the mainbody of the leg 2. The difference in area between the support blocks 3 and the support legs 2 may create a step between the top surface of the support legs 2 and the support block 3, allowing the slot 12 to slide up from the outer surface of the support legs 2 and fit surrounding the support block 3 after insertion. The formed step further ensures that the slot 12 is tightly fitted to the support block 3. This may allow the connector 1 to be locked in position once pushed to surround the support block 3. As described herein elsewhere, the sofa connector 1 of the present disclosure may be made of plastic. The plastic material may allow for easy insertion into the gap between two support legs 2 due to the tension of the plastic, making assembly and disassembly convenient. Additionally, the strength of the plastic sofa connector 1 is sufficient for securing the sofa components together.

Therefore, when using the connector 1, the two sofa components and/or frames may be placed together side by side, the support blocks 3 may be placed on the support legs 2, and the two slot openings 12a may be configured to face the two support legs 2. In some embodiments, subsequently, the slots 12 may be fitted to surround the support legs 2 along the outer surface of the support legs 2 and then fastened to the support block 3 (e.g., by being pushed upward). In this way, the use of the connector makes it easy to assemble the sofa, can be operated by one person only, and saves time and effort without requiring lifting up one sofa component.

As described herein elsewhere, the connector 1 may be made from elastic materials. For example, the sofa connector 1 may be an elastic component and the openings 12a of each slot 12 can be switched between a supported open state and a reset state. In other words, the openings 12a of the slots 12 may be opened by an external force to be fitted surrounding the supporting legs 2 and reset to be tightly clamped on the support block 3 (indented neck) when reaching the position of the support block 3.

Figure 4:
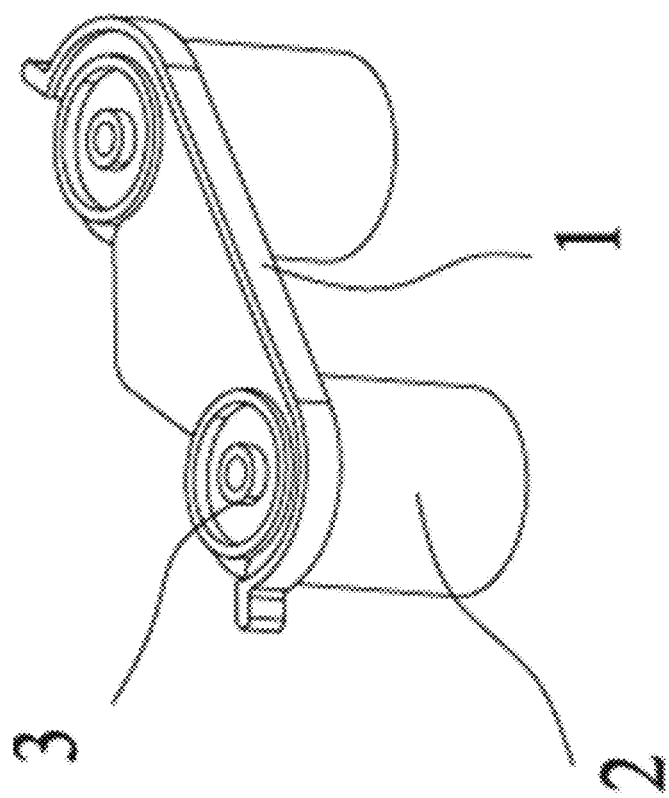
FIG. 4 schematically illustrates a perspective view of a connector assembly of the present disclosure in a locked state.
Figure 5:
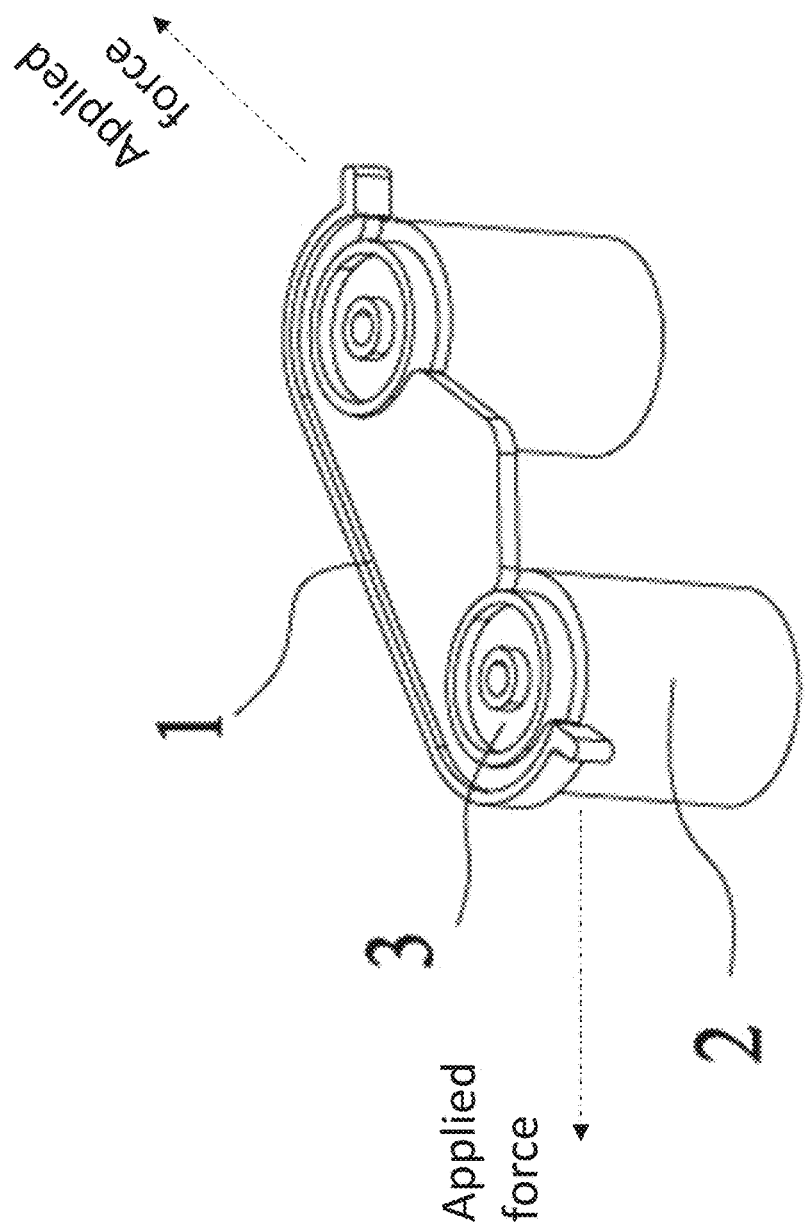
FIG. 5 schematically illustrates a perspective view of a connector assembly of the present disclosure in a locked state.

FIG. 4 schematically illustrates a perspective view of a connector assembly of the present disclosure in a locked state. FIG. 5 schematically illustrates a perspective view of a connector assembly of the present disclosure in a locked state from an angle that is different than in FIG. 4. As shown in FIG. 4 and FIG. 5, once the connector assembly is in a locked state, the slots of connector 1 may surround the support block 3 that is on the top of the legs 2. The connector 1 may therefore secure the two legs 2 (e.g., one each that is fixed to two sofa components, respectively) together, and thereby secure the two sofa components together. In some embodiments, as shown in FIG. 5, when dissembling the connector 1 from sofa components, one may apply force along the applied force directions, which may cause a deformation of the elastic connector 1, and thereby dissemble the connector assembly from a locked state. Although elastic-material-made connector 1 is described herein, in some embodiments, the connector 1 may be made from rigid materials, which is described in further details herein elsewhere.

FIGS. 6A and 6B schematically illustrate top views of a connector assembly of the present disclosure. As shown in FIGS. 6A and 6B, the connector assembly may comprise a support block 3. In some embodiments, the support block 3 is placed on support legs 2, and slot 12 of the sofa connector 1 is suitable for being clamped on cushion block 3. In some embodiments, by setting the support blocks 3 on the legs 2, respectively, the slot 12 of the sofa connector 1 can be clamped on support blocks 3 to connect two support legs 2, where the setting of support block 3 can make the slot 12 tightly surround the support block 3 and ensure the reliability of sofa assembly.

In some embodiments, the connector 1 may be a rigid member and the support block 3 has a first width edge and a second width edge, as shown in FIGS. 6A and 6B. In some embodiments, the width of the first width edge is greater than the width of the second width edge. In some embodiments, the support block 3 is set on the top surface of support legs 2. In some embodiments, during installation, the slot 12 of the sofa connector 1 may be inserted from the second width edge of the support block 3, then support legs 2 may be rotated to make the first width edge clamp the slot 12. That is, through the cooperation of the first width edge and the second width edge of support block 3, the rigid sofa connector 1 can be inserted via the second width edge to surround the support block 3, and then rotated and clamped to the first width edge of the support block 3.

As shown in FIGS. 6A and 6B, in some embodiments, the first width edge may be two symmetrical arc edges, and the second width edge may be two symmetrical straight line edges. In some embodiments, the support block 3 is placed on the top surface of support leg 2 and during installation, the slot 12 of the sofa connector 1 may be inserted with the opening 12a facing the two straight line edges, and then support leg 2 may be rotated to make the two arc edges clamp the inner wall of slot 12. It may be understood that the support block 3 may be two symmetrical positions cut out of a circular shape with two straight line edges. In some embodiments, if the sofa connector 1 is made from rigid materials, no tension is generated when inserted to surround the support leg 2. Therefore, by configuring the support block 3 as the example shown in FIGS. 6A and 6B, when slot 12 is inserted to surround the support block 3, by rotating the support leg 2, the arc edge of the support block 3 can be transferred from the vertical direction to the horizontal direction, which can clamp the slot 12. In addition, the configuration of support block 3 can produce a difference in area with support leg 2 (e.g., smaller area than the cross-section area of the leg 2), forming a step on the top surface of support leg 2 and support block 3, further ensuring that slot 12 is clamped to support block 3 (i.e., no up-and-down movement once clamped into a locked position).

According to some embodiments of the present disclosure, the sofa connector 1 may be a metal hardware with sufficient strength and no risk of fracture. Additionally or alternatively, the support block 3 and the support leg 2 may be integrated, and the insertion of the slot 12 to surround the support block 3 may be understood as the insertion of the leg 2 into the slot 12.

Therefore, when using this connector 1, two or more sofa components, frames, and/or portions may be assembled together. In some embodiments, the support block 3 may be placed on the support leg 2, and the two opening 12a of the two slots 12 are inserted to surround the two support blocks 3 on two closely adjacently-placed support legs 2 (and by extension, the sofa components that they are fixed to) of the sofa. In some embodiments, the support leg 2 may be then rotated to tighten the slot 12 within the support block 3. The use of this connector 1 makes it easy to assemble the sofa with only one person, saving time and effort, and the support block 3 is easy to tighten within the slot 12.

Therefore, when using this connector 1, two sofa frames are assembled together, the support block 3 is placed on the support leg 2, and the two open ends 12a of the two slots 12 are inserted into two support blocks 3 on two closely adjacent support legs 2 of the sofa, and the support leg 2 is then rotated to tighten the slot 12 into the support block 3. The use of this connector 1 makes it easy to assemble the sofa with only one person, saving time and effort, and the support block 3 is easy to tighten with the slot 12.

Figure 7:
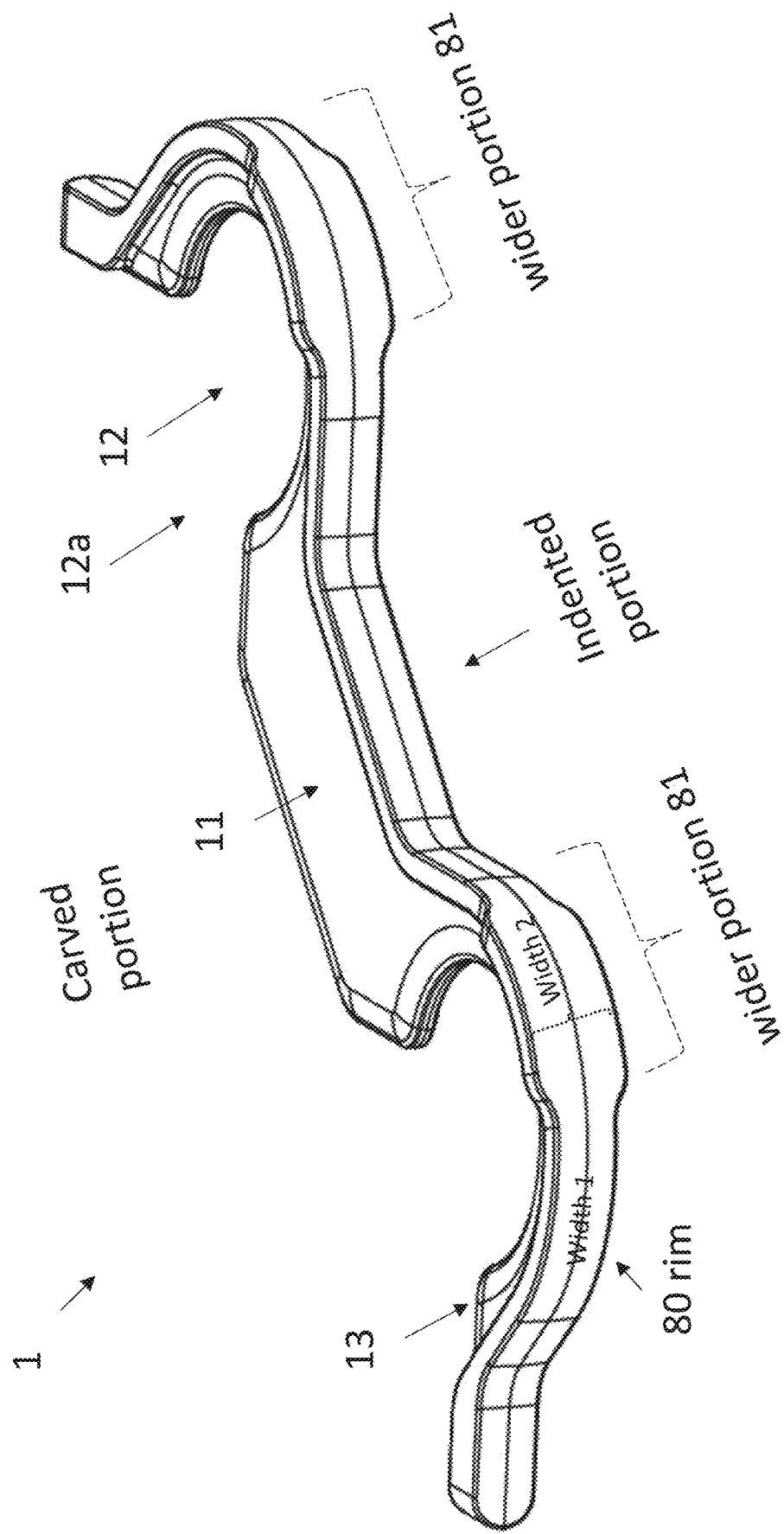
FIG. 7 schematically illustrates a perspective view of a connector of the present disclosure.
Figure 8:
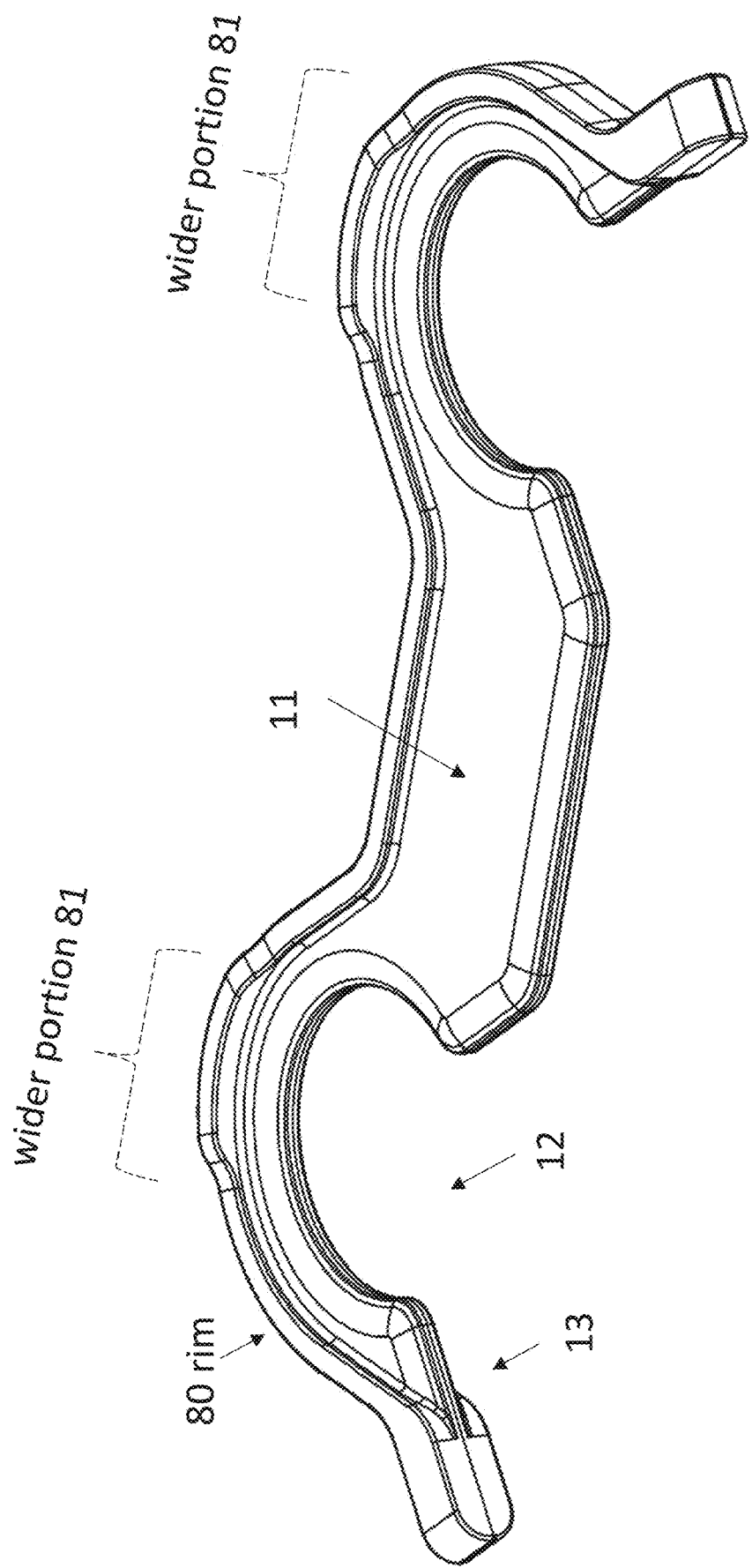
FIG. 8 schematically illustrates a perspective view of a connector of the present disclosure from an angle that is different than the angle in FIG. 7.

FIGS. 7-8 schematically illustrate a perspective view of a connector of the present disclosure, from different angles. As shown in FIG. 7, the connector 1 may comprise a middle board 11, one or more arms 13, and one or more slots 12. In some embodiments, the arm 13 may comprise a curved portion, wherein the corresponding side of the middle board 11 and the curved portion 131 may form the slot 12. In some embodiments, the middle board 11 may have an inward indentation (as shown in FIG. 7, "indented portion"). This may save the amount of material needed to manufacture a connector 1. Additionally, because of this indented portion, the connector 1 is not easily visible after installation, which may improve the aesthetics appearance of the sofa. That is, the presence of an indented portion enhances the aesthetic appeal of the sofa by making the connector 1 less noticeable after installation. This may result in a cleaner and sleeker appearance, as the connector may blend seamlessly into the overall design of the sofa.

In some embodiments, as shown in FIG. 7, on the opposite side of the inward indentation, the middle board 11 may have a carved portion. This may help save the amount of material required to manufacture a connector 1. As shown in FIGS. 7-8, the connector 1 may have a rim 80 on the outer edge of the arms 13 and the middle board 11. The rim 80 may have a width that is greater than the width of the arms 13 and the middle board 11. In some embodiments, the width of the rim 80 may be 1 mm, 2 mm, 3 mm, 4 mm, 5 mm, 6 mm, 7 mm, 8 mm, 9 mm, or 10 mm greater than the width of the arms 13 and the middle board 11. In some embodiments, as shown in FIG. 7, the rim 80 may comprise a wider portion 81. In some embodiments, the wider portion 81 may be configured to be opposite to the opening 12a of the slot 12. In some embodiments, as shown in FIG. 7, the wider portion 81 may have a width of Width 2, and the rest of the rim 80 may have a width of Width 1. In some embodiments, Width 2 may be 1 mm, 2 mm, 3 mm, 4 mm, 5 mm, 6 mm, 7 mm, 8 mm, 9 mm, 10 mm, 11 mm, 12 mm, 13 mm, 14 mm, or 15 mm greater than the Width 1. In some embodiments, the Width 1 may be 10 mm, and the Width 2 may be 15 mm, and the width of the arms 13 and the middle board 11 may be 5 mm. The design of the wider portion 81 has been optimized to enhance the ease of use of the connector 1, while also ensuring that the user's finger is protected from being pinched. The wider configuration 81 of the rim 80 has been carefully crafted to provide a more comfortable and safe user experience. This is achieved by allowing for a more ergonomic grip when utilizing the connector 1, and by reducing the risk of any accidental pinching that may occur. By taking these measures, the design aims to provide users with a smooth and worry-free experience when using the device.

Figure 9B:
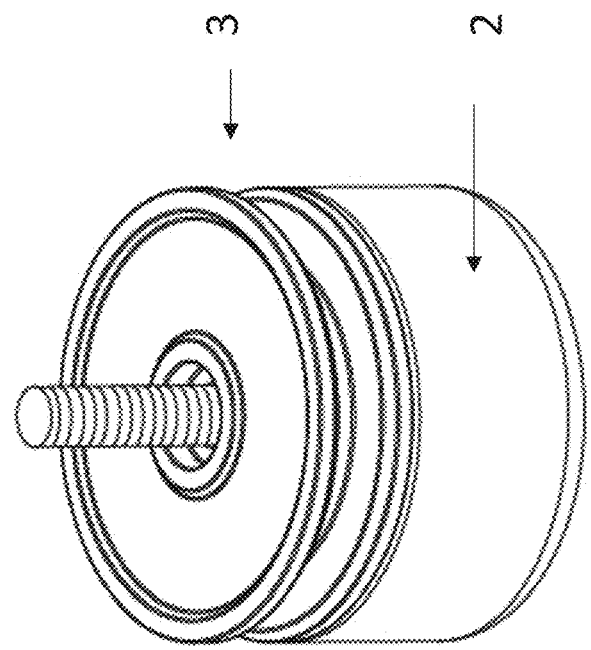
FIGS. 9A and 9B schematically illustrate a perspective view of the legs and support block to be fixed to a sofa component as support member of the sofa component.
Figure 9A:
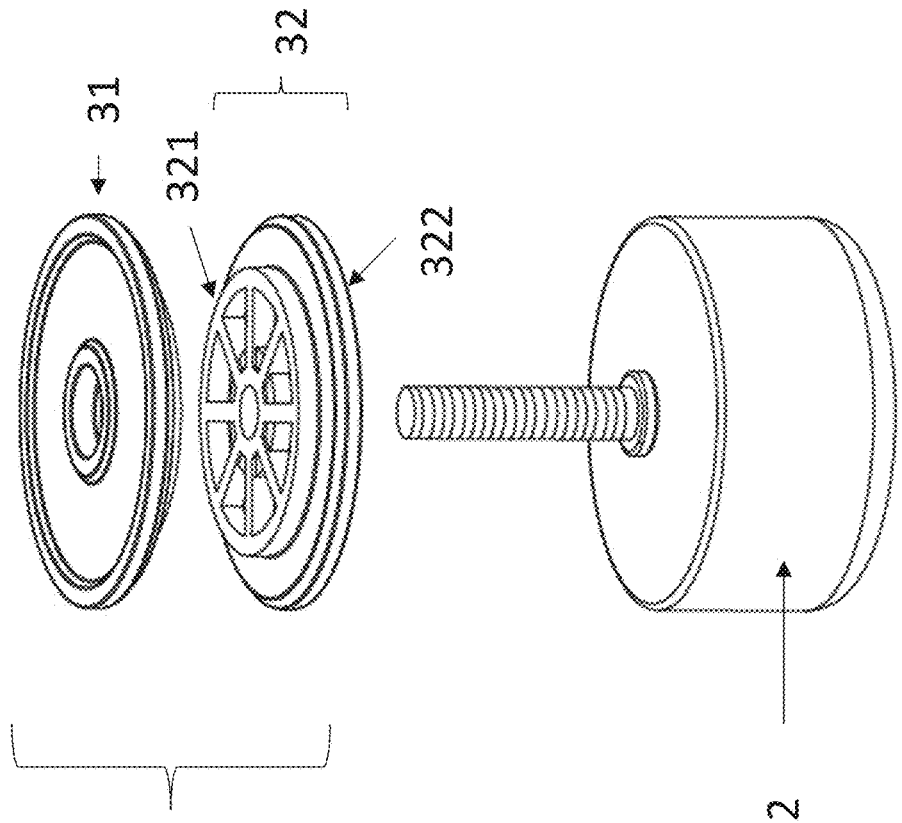

FIGS. 9A and 9B schematically illustrates a perspective view of the legs 2 and support block 3 to be fixed to a sofa component as support member of the sofa component. As shown in FIG. 9A, the support block 3 may comprise a lid 31 and a neck 32. In some embodiments, as shown in FIG. 9A, the neck 32 may comprise a top portion 321 that has smaller dimension than the bottom portion 322 of the neck 32. For example, the top portion 321 may have a smaller cross-section area than the bottom portion 322. In some embodiments, the top portion 321 of the neck 32 may have a substantially-circle shape cross-section area. In some embodiments, the top portion 321 of the next 32 may have a perfect circle shape cross-section area. In some embodiments, the top portion 321 of the neck 32 may have a shape that is corresponding to the shape of slot 12 of the connector 1. For example, the top portion 321 of the neck 32 may have a dimension that is slightly smaller than the slot 12. In some embodiments, the gap between the slot 12 and the top portion 321, after installation, may be less than 0.1 mm, 0.2 mm, 0.3 mm, 0.4 mm, 0.5 mm, 0.6 mm, 0.7 mm, 0.8 mm, 0.9 mm, 1 mm, 2 mm, etc. In some embodiments, the top portion 321 of the neck 32 may have a height that is correspond with the width of the arm 13 and middle board 11 of the connector 1. For example, the height of the top portion 321 may be slightly smaller than the width of the arm 13 and the middle board 11 of the connector 1. In some embodiments, the distance between the lid 31 and the bottom portion 322 of the neck 32 (i.e., the height of the top portion 321) may be 0.1 mm, 0.2 mm, 0.3 mm, 0.4 mm, 0.5 mm, 0.6 mm, 0.7 mm, 0.8 mm, 0.9 mm, 1 mm, 2 mm greater than the width of the arm 13 and the middle board 11 of the connector 1.

Figure 10:
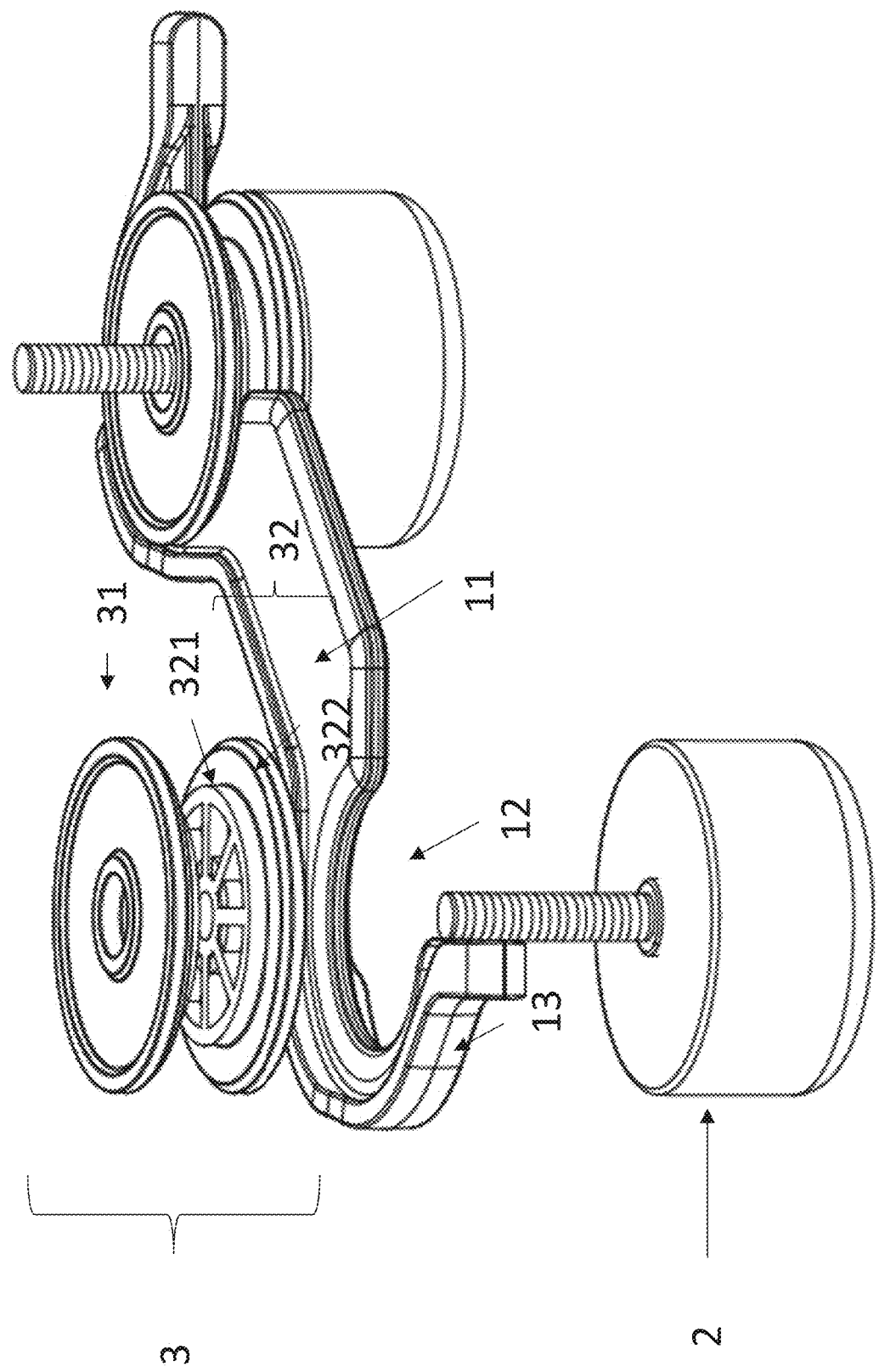
FIG. 10 schematically illustrates a perspective view of a connector assembly of the present disclosure.

FIG. 10 schematically illustrates a perspective view of a connector assembly of the present disclosure. In some embodiments, as shown in FIG. 10, the lid 31 and the bottom portion 322 may have same cross-section shape, for example, substantially-circle shape. In some embodiments, the lid 31 and the bottom portion 322 may have same cross-section area, for example, same perimeter. In some embodiments, the lid 31 and the bottom portion 322 may have different cross-section shape. In some embodiments, the lid 31 and the bottom portion 322 may have different cross-section area. In some embodiments, the cross-section area of the slot 12 may be smaller than the smaller one of the lid 31 and the bottom portion 322, so to allow for a locked state being formed among the lid 31, bottom portion 322, top portion 321 and the arm 13 around the top portion 321. With this configuration of a smaller cross-section area of the slot 12 compared to the smaller one of the lid 31 and the bottom portion 322, the connector assembly may provide secure locking when the locked state created between the lid 31, bottom portion 322, top portion 321, and arm 13 around the top portion 321, which may help ensure that the arm 13 remains securely in place between lid 31 and the bottom portion 322 after installation, preventing any unintended openings or detachments. This configuration may also add stability to the overall system, making it less likely to be impacted by external forces that could cause it to move or become unaligned.

Figure 11:
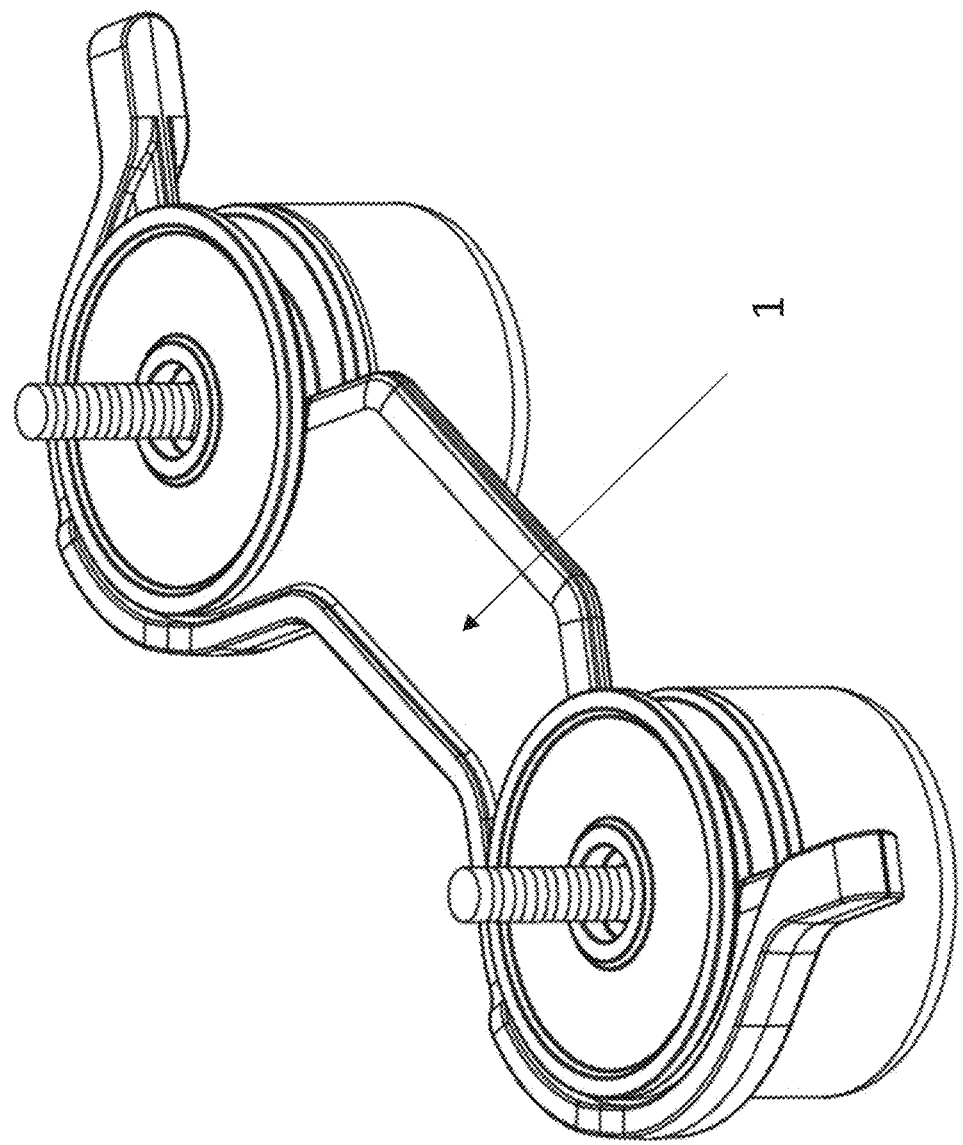
FIG. 11 schematically illustrates a perspective view of a connector assembly of the present disclosure in a locked state.
Figure 12:
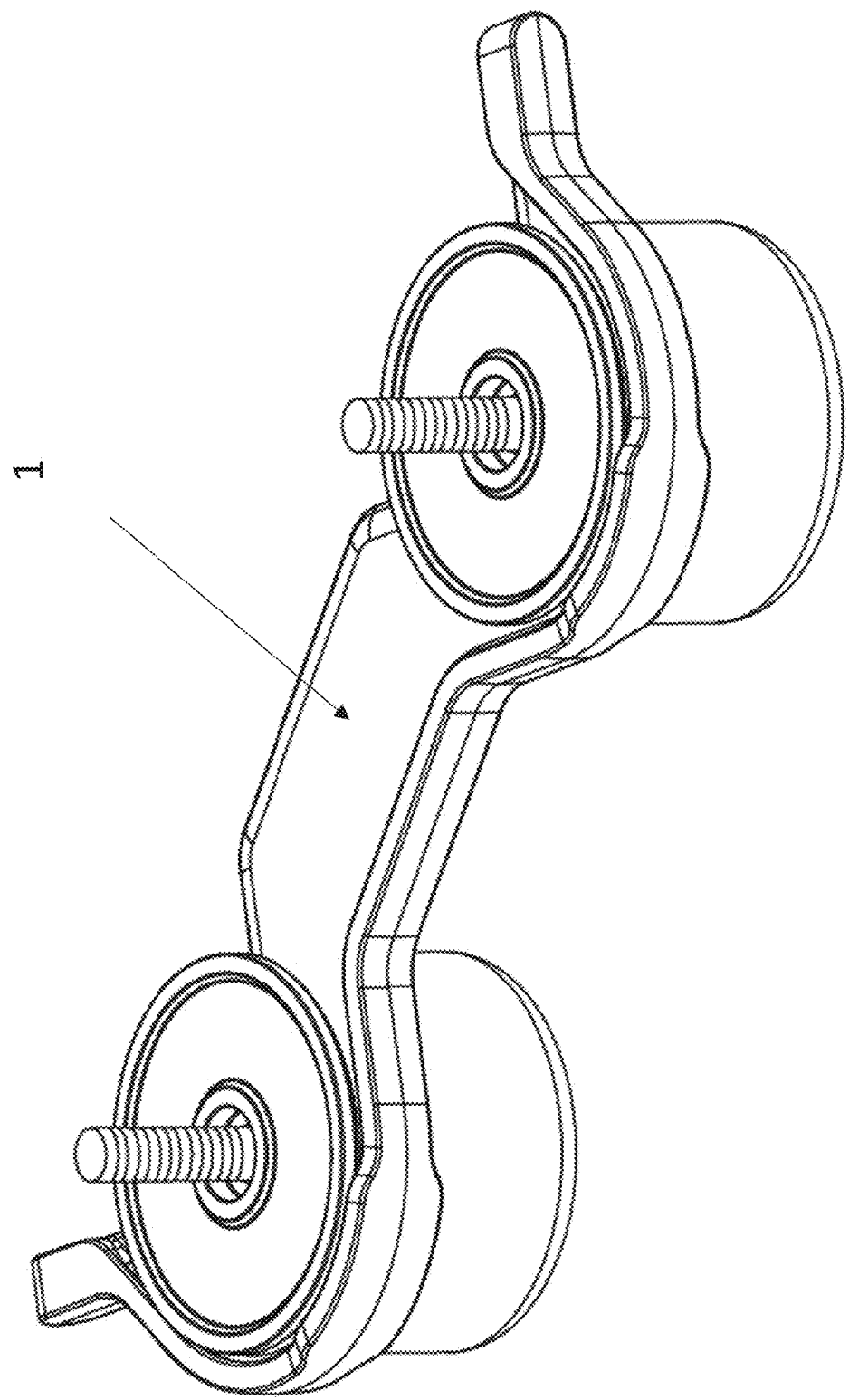
FIG. 12 schematically illustrates a perspective view of a connector assembly of the present disclosure in a locked state.

FIG. 11 schematically illustrates a perspective view of a connector assembly of the present disclosure in a locked state. FIG. 12 schematically illustrates a perspective view of a connector assembly of the present disclosure in a locked state from an angle that is different than the angle in FIG. 11. In some embodiments, as shown in FIG. 11 and FIG. 12, the connector 1 may have an inward indentation (as shown in FIG. 7, "indented portion"). This may save the amount of material needed to manufacture a connector 1. Additionally, because of this indented portion, the connector 1 is not easily visible after installation, which may improve the aesthetics appearance of the sofa. That is, the presence of an indented portion enhances the aesthetic appeal of the sofa by making the connector 1 less noticeable after installation. This may result in a cleaner and sleeker appearance, as the connector may blend seamlessly into the overall design of the sofa. In some embodiments, on the opposite side of the inward indentation, the middle board 11 may have a carved portion (as shown in FIG. 7, "carved portion"). With this configuration of the connector 1, the amount of material required to manufacture the connector 1 can be reduced, resulting in lower costs and a more efficient manufacturing process. The low weight of the connector 1 may also result in lower shipping costs. Additionally, the carved portion can also improve the overall performance of the connector 1, as it helps to minimize the weight and bulk of the product without sacrificing its strength and durability. This carved portion may also contribute to a more aesthetically pleasing design, creating a sleek and modern look that appeals to a wide range of consumers.

Figure 13:
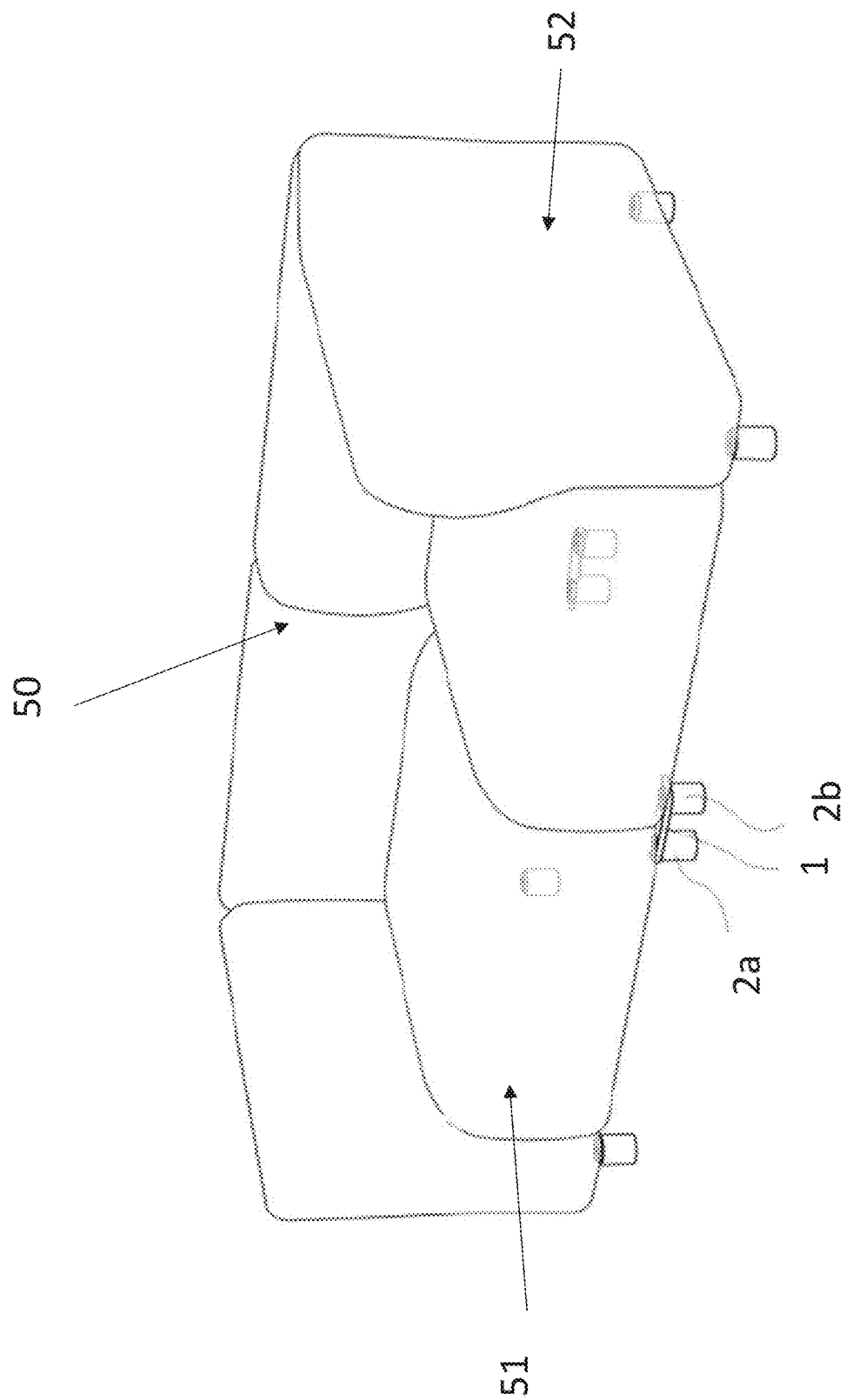
FIG. 13 schematically illustrates a perspective view of a sofa with sofa components connected by connector of the present disclosure.

FIG. 13 schematically illustrates a perspective view of a sofa 50 with sofa components 51 and 52 connected by connector of the present disclosure. As shown in FIG. 13, sofa component 51 may comprise multiple legs 2, wherein a leg 2a may be a to-be-connected leg. Sofa component 52 may comprise multiple legs 2, wherein a leg 2b may be a to-be connected leg. As shown in FIG. 13, the two sofa components 51 and 52 may be placed side-by-side, with leg 2a and leg 2b adjacent to each other. In some embodiments, the connector 1 may be utilized to connect the two legs, as described elsewhere herein. This configuration may eliminate the need to lift up one of the sofa components in order to connect them, which may eliminate the lifting and maneuvering heavy parts, making the process easier and less physically demanding.

Figure 14:
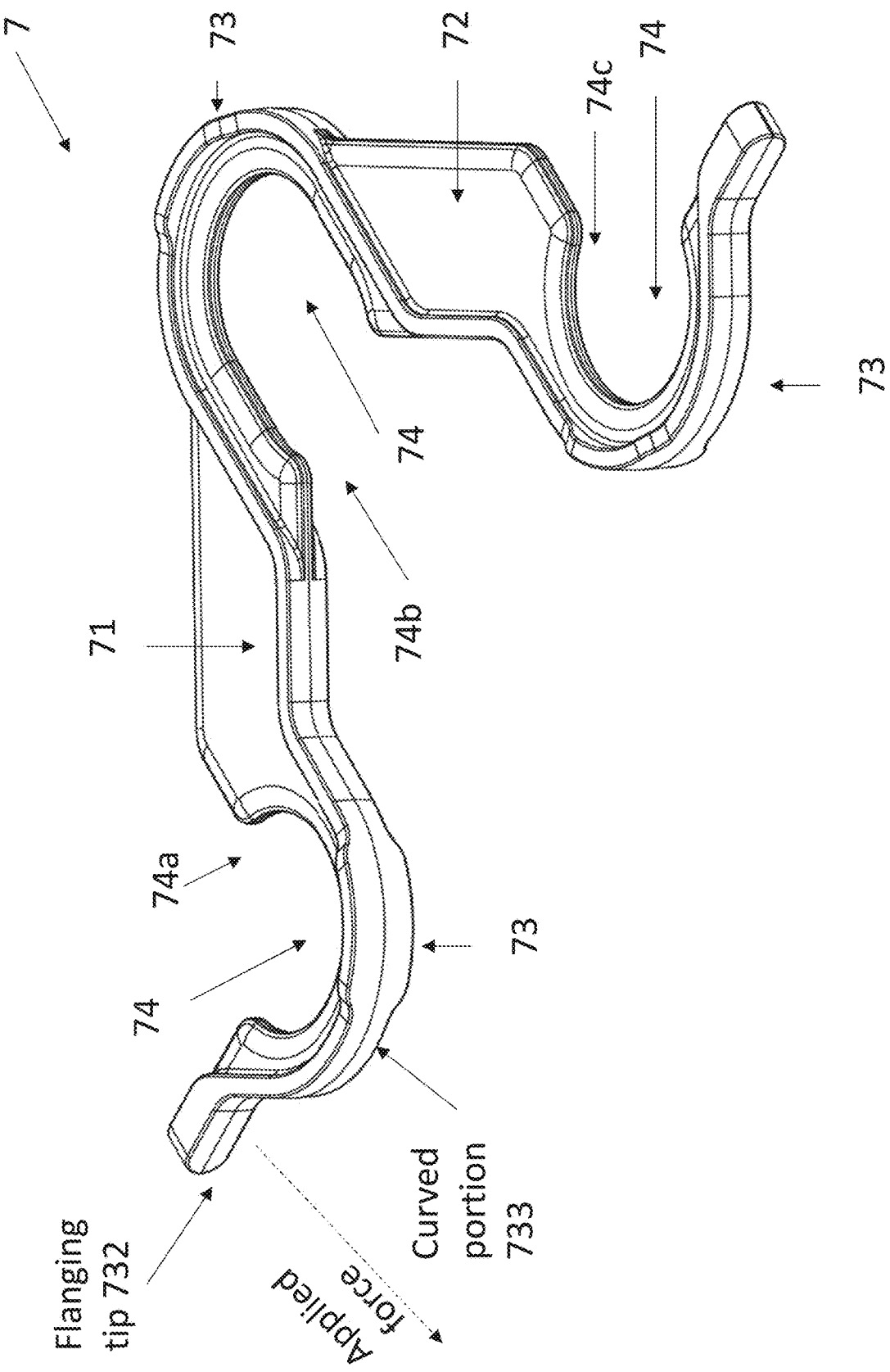
FIG. 14 schematically illustrates a perspective view of a connector of the present disclosure.

FIG. 14 schematically illustrates a perspective view of a connector 7 of the present disclosure. As shown in FIG. 14, the connector 7 may comprise a first middle board 71, a second middle board 72, one or more arms 73, and one or more slots 74. The connector 7, in some embodiments of the present disclosure, provides a way to connect three adjacent support legs 2 of three or more sofas and/or three or more sofa components to form a double or multi-person sofa. The connector 7 may comprise three slots 74 that are spaced apart by the first middle board 71 and the second middle board 72. In some embodiment, the connector 7 is defined to engage with three support legs 2 that are adjacent to one another. As shown in FIG. 14, the arm 73 may comprise a curved portion 733, wherein the curved portion 733 may form the slot 74. In some embodiments, the slot 74 may have a substantially round inner shape, with an opening 74a to receive one or more supporting elements (e.g., legs) of the sofa components. In some embodiments, the slot 74 is in a perfect circle shape with an opening 74a. In some embodiments, the opening 74a may serve as a receiving path for a leg of the sofa component to fit into the slot 74. In some embodiments, the slot 74 is arched, such as it has a partially round ring shape. The legs 2 (not shown in FIG. 1) of the sofa or sofa component may be mostly designed as cylindrical. That is, the support legs 2 can be smoothly fitted into the arched slot 74, further simplifying the assembly of the sofa.

In some embodiments, one or more of the arms 73 may comprise the curved portion and an additional flanging tip 732, as shown in FIG. 14. In some embodiments, one end of the arm 73 may be connected to one of the middle boards 71 and 72, and the other end is bended upward to form the flanging tip 732. The slot 74 is formed by the curved portion 733 of the arm 73 (additionally or alternatively, together with middle board 71 or 72). That is, in some embodiments, the slot 74 is formed by one side of middle board (e.g., middle board 71) and arm 73. The curved portion 733 may provide the slot 74 with an arched shape, allowing it to fit surrounding the support legs 2.

In some embodiments, as shown in FIG. 14, the flanging tip 732 may be configured to be bent outward from the curved portion 733 at the opening 74a of slot 74. In some embodiments, the flanging tip 732 may provide a handle when assembling and/or dissembling the connector 7 to and/or from a sofa component, and therefore facilitate easy use of the connector 7. For example, as shown in FIG. 14, when assembling and/or dissembling the connector 7 to and/or from a sofa component, one may apply force to the flanging tip 132 along the applied force direction to enlarge the opening 74a so to allow easy connection and/or disconnection.

As shown in FIG. 14, the three slots 74 may have openings facing different directions. For example, opening 74a may face a direction that is 90 degree or close to 90 degrees away from opening 74b. In some embodiments, the opening 74b may face a direction that is 90 degree or close to 90 degrees away from opening 74c. In some embodiments, the opening 74a may face the opposite direction compared to opening 74c. This configures of the connector 7 with openings facing directions that are substantially 90 degrees from one another may allow for multiple connection options, providing greater flexibility and versatility in the assembly process. Additionally, by being able to connect the sofa components in different orientations, the stability of the overall assembly can be improved, reducing the risk of tipping or instability.

Figure 15:
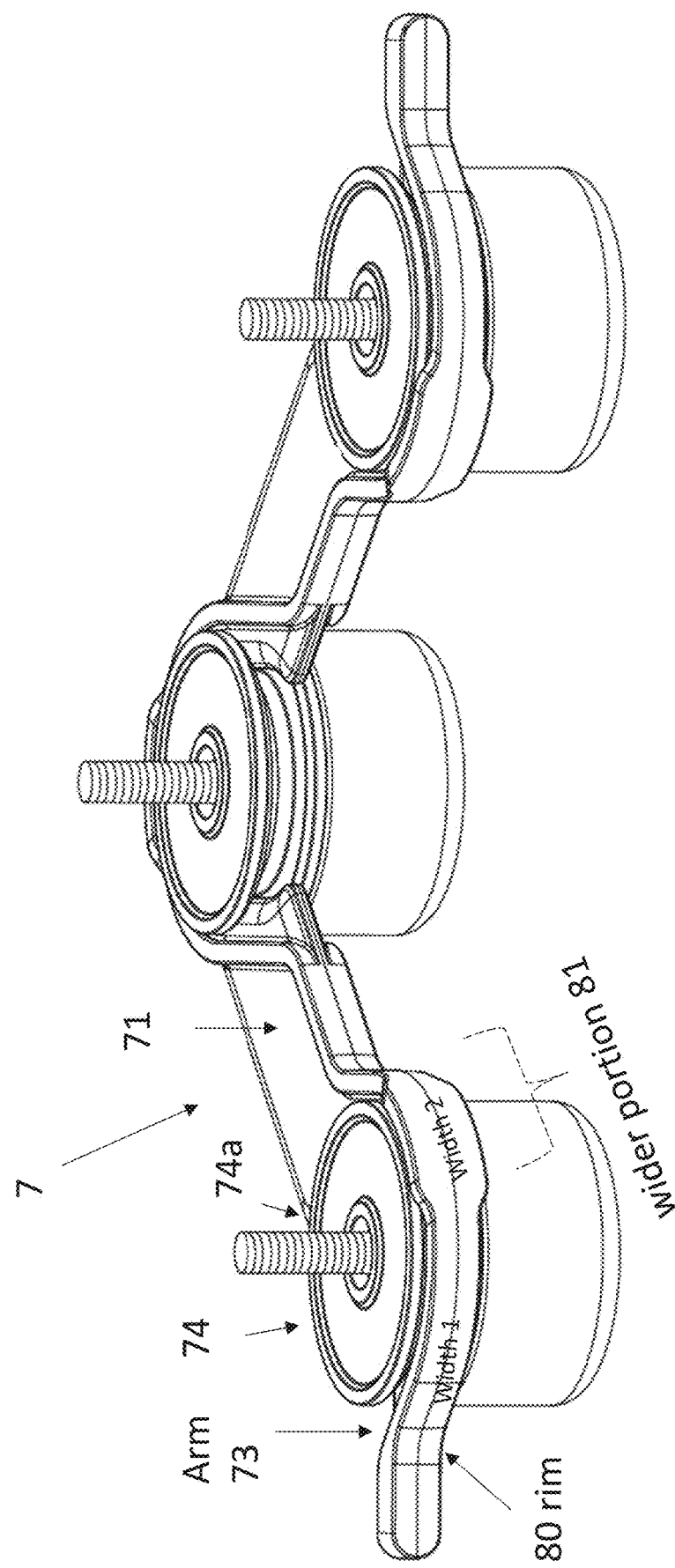
FIG. 15 schematically illustrates a perspective view of a connector assembly of the present disclosure in a locked state.
Figure 16:
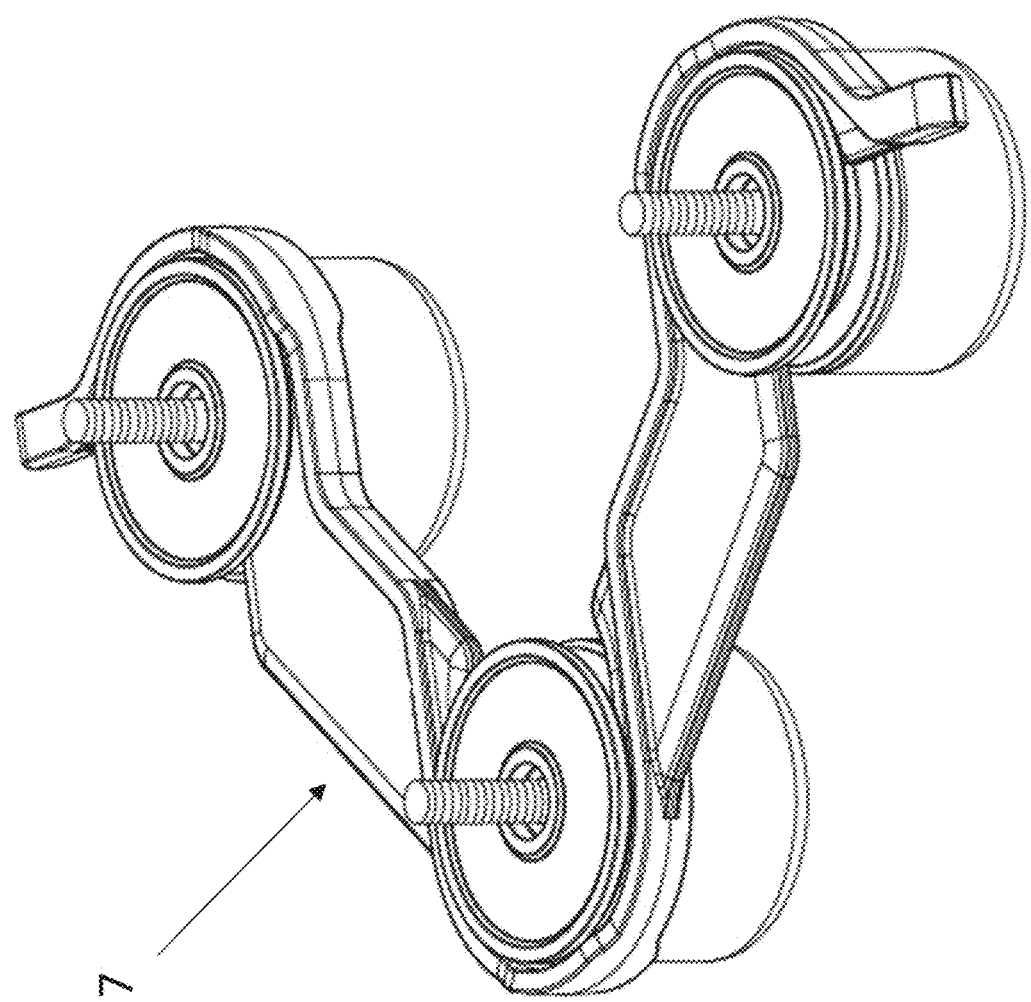
FIG. 16 schematically illustrates a perspective view of a connector assembly of the present disclosure in a locked state.

FIG. 15 schematically illustrates a perspective view of a connector assembly of the present disclosure in a locked state. FIG. 16 schematically illustrates a perspective view of a connector assembly of the present disclosure in a locked state from an angle that is different than the angle in FIG. 15. In some embodiments, as shown in FIG. 15 and FIG. 16, the connector 7 may secure three legs together to form a connected assembly, and thereby providing greater flexibility and versatility in the assembly process. As shown in FIG. 15, the connector 7 may comprise a rim 70 on the outer edge of the arms 73. In some embodiments, the connector 7 may have a rim 80 on the outer edge of the arms 73 and the middle board 71. The rim 80 may have a width that is greater than the width of the arms 73 and the middle board 71. In some embodiments, the width of the rim 80 may be 1 mm, 2 mm, 3 mm, 4 mm, or 5 mm greater than the width of the arms 73 and the middle board 71. In some embodiments, as shown in FIG. 15, the rim 80 may comprise a wider portion 81. In some embodiments, the wider portion 81 may be configured to be opposite to the opening 74a of the slot 74. In some embodiments, as shown in FIG. 15, the wider portion 81 may have a width of Width 2, and the rest of the rim 80 may have a width of Width 1. In some embodiments, Width 1 may be 1 mm, 2 mm, 3 mm, 4 mm, or 5 mm greater than the Width 1. The design of the wider portion 81 has been optimized to enhance the ease of use of the connector 7, while also ensuring that the user's finger is protected from being pinched. The wider configuration 81 of the rim 80 has been carefully crafted to provide a more comfortable and safe user experience. This is achieved by allowing for a more ergonomic grip when utilizing the connector 7, and by reducing the risk of any accidental pinching that may occur. By taking these measures, the design aims to provide users with a smooth and worry-free experience when using the device.

Figure 17:
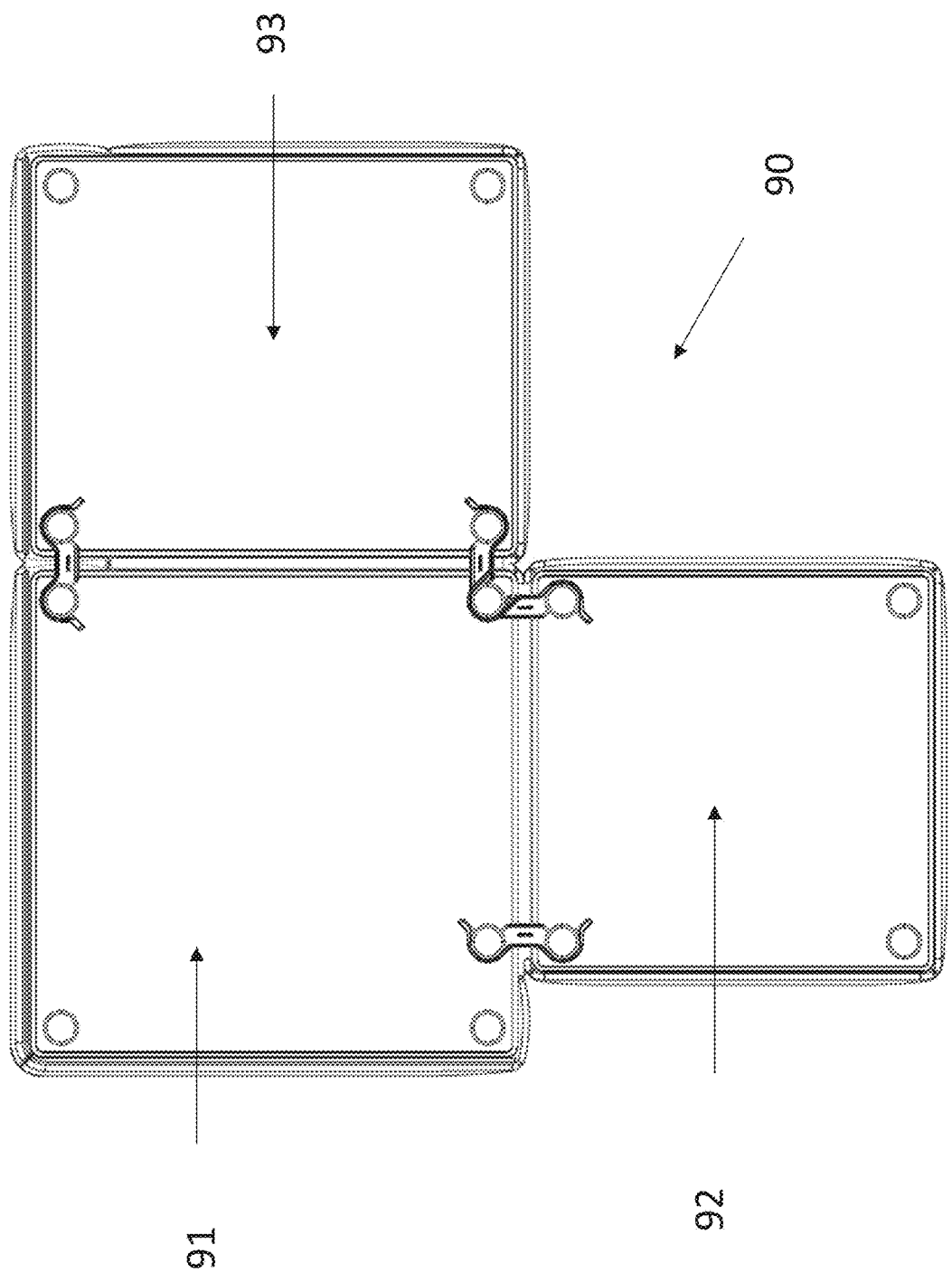
FIG. 17 schematically illustrates a bottom view of a sofa with sofa components connected by the connector of the present disclosure.

FIG. 17 schematically illustrates a bottom view of a sofa 90 with sofa components 91, 92, and 93 connected by connector of the present disclosure, three sofa components 91, 92, and 93 may be placed adjacent to one another. To use the connector 7, the three sofa components and/or sofa frames 91, 92, and 93 are placed side by side with respect to one another as shown in FIG. 17. The slots 74 of the connector 7 may be aligned to fit surrounding the legs of the sofa components 91, 92, and 93. In some embodiments, to ensure the reliability of the connection between the sofa connector 7 and the support legs 2, the shape of the slot 74 may be adapted to the shape of the location where the support legs 2 are fitted into the slots 74. That is, the slot 74 can be tightly fitted at the position where the support legs 2 are fitted into the slots 74. For example, anti-slip rings may be installed in the position where the support legs 2 are fitted into the slots, and/or the fitted location of the support legs 2 may be designed with steps, wherein the steps may provide sufficient traction between the connector 7 and the support legs 2 to secure them in a locked position.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A connector assembly, comprising:
   at least two legs, wherein each of the at least two legs is configured to be fixed to a sofa component, respectively; and
   a connector, wherein the connector comprises:
      at least one middle board; and
      one or more arms extending from the at least one middle board, wherein each arm of the one or more arms is configured to form a slot for receiving a corresponding leg of the at least two legs of the sofa component;
      wherein at least one of the one or more arms comprises a flanging tip, and
   wherein each of the at least two legs has a cross-section shape that is correspond to an inner shape of the slot,
   wherein the each of the at least two legs comprises a support block located on a top portion of the leg, and wherein the support block comprises a lid and a neck comprising a top portion and a bottom portion.

2. The connector assembly of claim 1, wherein the support block has a smaller cross-section area than a cross-section area of a mainbody of the at least two legs.

3. The connector assembly of claim 1, wherein the top portion of the neck has a smaller cross-section area than the bottom portion of the neck.

4. The connector assembly of claim 1, wherein the connector further comprises a rim located on an outer edge of the one or more arms and the at least one middle board, wherein the rim has a width that is greater than the width of the one or more arms of the at least one middle board.

5. The connector assembly of claim 4, wherein the rim comprises a wider portion, wherein the wider portion has a width that is greater than the width of the rest of the rim.

6. The connector assembly of claim 1, wherein the connector comprises two or more arms.

7. The connector assembly of claim 1, wherein the one or more arms comprise a curved portion, wherein the curved portion is substantially round with an opening.

8. The connector assembly of claim 7, wherein the opening is configured to allow the leg of the sofa component to pass through when assembling the connector with one or more sofa components, and thereby facilitate the leg to be fit inside the slot.

9. The connector assembly of claim 1, wherein the connector comprises two arms.

10. A sofa, comprising:
    one or more sofa components, wherein the one or more sofa components are configured to be connected by one or more connector assemblies,
    wherein the one or more connector assemblies comprise:
       at least two legs, wherein each of the at least two legs is configured to be fixed to one of the one or more sofa components; and
       a connector, wherein the connector comprises:
          at least one middle board; and
          one or more arms extending from the at least one middle board, wherein each arm of the one or more arms is configured to form a slot for receiving a corresponding leg of the at least two legs of the one or more sofa components;
       wherein at least one of the one or more arms comprises a flanging tip, and wherein each of the at least two legs has a cross-section shape that is correspond to an inner shape of the slot,
    wherein the each of the at least two legs comprises a support block located on a top portion of the leg, and wherein the support block comprises a lid and a neck comprising a top portion and a bottom portion.

11. The sofa of claim 10, wherein the support block has a smaller cross-section area than a cross-section area of a mainbody of the at least two legs.

12. The sofa of claim 10, wherein the connector further comprises a rim located on an outer edge of the one or more arms and the at least one middle board, wherein the rim has a width that is greater than the width of the one or more arms of the at least one middle board.

13. The sofa of claim 12, wherein the rim comprises a wider portion, wherein the wider portion has a width that is greater than the width of the rest of the rim.

14. The sofa of claim 10, wherein the one or more arms comprise a curved portion, wherein the curved portion is substantially round with an opening.

15. The sofa of claim 14, wherein the opening is configured to allow the leg of the sofa component to pass through when assembling the connector with one or more sofa components, and thereby facilitate the leg to be fit inside the slot.

16. The sofa of claim 10, wherein the connector comprises two arms.

* * * * *